United States Patent
Jung

(10) Patent No.: US 9,250,750 B2
(45) Date of Patent: Feb. 2, 2016

(54) FLAT PANEL DISPLAY WITH BUILT-IN TOUCH PANEL

(75) Inventor: Myung-Sook Jung, Yongin (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 240 days.

(21) Appl. No.: 13/067,289

(22) Filed: May 23, 2011

(65) Prior Publication Data

US 2012/0105339 A1    May 3, 2012

(30) Foreign Application Priority Data

Oct. 29, 2010  (KR) .......................... 10-2010-0106739

(51) Int. Cl.
*G06F 3/041*    (2006.01)
*G06F 3/044*    (2006.01)

(52) U.S. Cl.
CPC .............. *G06F 3/044* (2013.01); *G06F 3/0412* (2013.01)

(58) Field of Classification Search
CPC ....................................................... G06F 3/044
USPC .................................... 345/156–182, 87–100
See application file for complete search history.

(56) References Cited

U.S. PATENT DOCUMENTS

| | | | | |
|---|---|---|---|---|
| 2002/0008681 A1* | 1/2002 | Hanakawa | ............ | G02F 1/1345 345/87 |
| 2002/0031904 A1* | 3/2002 | Shibata et al. | ................ | 438/615 |
| 2006/0275967 A1* | 12/2006 | Kang et al. | ..................... | 438/183 |
| 2007/0070047 A1* | 3/2007 | Jeon et al. | ...................... | 345/173 |
| 2007/0171512 A1* | 7/2007 | Lee | ................................ | 359/296 |
| 2009/0002336 A1* | 1/2009 | Choi et al. | ..................... | 345/174 |
| 2009/0102814 A1* | 4/2009 | Lin et al. | ........................ | 345/174 |
| 2009/0256820 A1* | 10/2009 | Yanase | ................... | G06F 3/0412 345/174 |
| 2010/0007616 A1 | 1/2010 | Jang | | |
| 2011/0102361 A1* | 5/2011 | Philipp | .......................... | 345/174 |
| 2011/0227858 A1* | 9/2011 | An et al. | ......................... | 345/174 |
| 2011/0291982 A1* | 12/2011 | Hsieh et al. | .................... | 345/174 |

FOREIGN PATENT DOCUMENTS

| | | |
|---|---|---|
| KR | 10-2006-0055873 | 5/2006 |
| KR | 10-2009-0019902 A | 2/2009 |
| KR | 10-2009-0132359 A | 12/2009 |
| KR | 10-2010-0007717 | 1/2010 |

* cited by examiner

*Primary Examiner* — Jason Olson

(74) *Attorney, Agent, or Firm* — Lee & Morse, P.C.

(57) ABSTRACT

A flat panel display with a built-in touch panel includes a display panel having a lower substrate, an upper substrate, and a plurality of touch sensing patterns on the upper substrate. The plurality of touch sensing patterns includes a plurality of sensing cells on a bottom surface of the upper substrate that faces the lower substrate, a plurality of outer lines on the bottom surface of the upper substrate that connect lines of sensing cells of the plurality of sensing cells along at least one of a first direction or a second direction to a driving circuit, a plurality of connection lines that correspond to respective outer lines on the lower substrate. The plurality of outer lines are connected to the driving circuit via the plurality of connection lines on the lower substrate, and the plurality of outer lines are electrically connected to the corresponding connection lines.

18 Claims, 5 Drawing Sheets

FLAT PANEL DISPLAY WITH BUILT-IN TOUCH PANEL

CROSS-REFERENCE TO RELATED APPLICATION

This application claims priority to and the benefit of Korean Patent Application No. 10-2010-0106739, filed on Oct. 29, 2010, in the Korean Intellectual Property Office, the entire content of which is incorporated herein by reference.

BACKGROUND

1. Field

Embodiments relate to a flat panel display with a built-in touch panel.

2. Description of the Related Art

A touch panel is an input device that may allow a user's instruction to be inputted by selecting an instruction content displayed on a screen of an image display or the like with a user's hand or object.

The touch panel may be formed on a front face of the image display to convert a contact position into an electrical signal. A user's hand or an object may contact, e.g., directly contact, the touch panel at the contact position. Accordingly, the instruction content selected at the contact position may be inputted as an input signal to the image display.

Since such a touch panel can be substituted for a separate input device connected to an image display, such as a keyboard or mouse, the application fields for a touch panel have been gradually extended.

SUMMARY

Embodiments may be realized by providing a flat panel display with a built-in touch panel, including a display panel having lower and upper substrates and a plurality of touch sensing patterns formed on the upper substrate. The touch sensing patterns include a plurality of sensing cells formed on a bottom surface of the upper substrate that face the lower substrate, and outer lines formed at the bottom surface of the upper substrate to connect the sensing cells by the line along a first or second direction to a driving circuit. The outer lines are connected to the driving circuit via the connection lines while being electrically connected to the connection lines formed to correspond to the respective outer lines on the lower substrate.

The flat panel display may further include a step forming pattern formed between the outer lines and the upper substrate and/or between the connection lines and the lower substrate in a contact region in which the outer lines and the connection lines are connected to each other so as to allow the outer lines or the connection lines to be protruded.

The step forming pattern may include an organic insulating layer composed of one or more layers.

The plurality of outer lines or the plurality of connection lines may share one step forming pattern with one another.

The step forming pattern may include a plurality of step forming patterns, and one or more outer lines or connection lines may be disposed on each of the step forming patterns.

Neighboring step forming patterns may be disposed to cross each other so as not to be positioned on the same horizontal or vertical line.

The plurality of step forming patterns may be disposed in a zigzag pattern.

At least a portion of the step forming patterns may be formed on the bottom surface of the upper substrate to include the same material as a color filter, a black matrix or a column spacer, which is formed on the upper substrate.

At least a portion of the step forming patterns may be formed on the top surface of the lower substrate to include the same material as a passivation layer or a column spacer, which is formed on the lower substrate.

The outer lines may be routed into both sides of the upper substrate, and one or more step forming patterns formed between the outer lines and the upper substrate to allow the outer lines to be protruded in the direction of the lower substrate may be formed at both respective ends of the upper substrate.

The outer lines and the connection lines may be electrically connected while coming in direct contact with each other.

An upper step forming pattern formed between the outer lines and the upper substrate and a lower step forming pattern formed between the connection lines and the lower substrate to correspond to the upper step forming pattern may be provided in the contact region in which the outer lines and the connection lines come in contact with each other.

The flat panel display may further include a flexible printed circuit board (FPCB) connected to one end of the lower substrate to be electrically connected to driving lines of the display panel. The FPCB may also be connected to the outer lines via the connection lines.

The flat panel display may further include a driving IC mounted at one side of the lower substrate. The driving IC may be connected to the outer lines via the connection lines.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1:
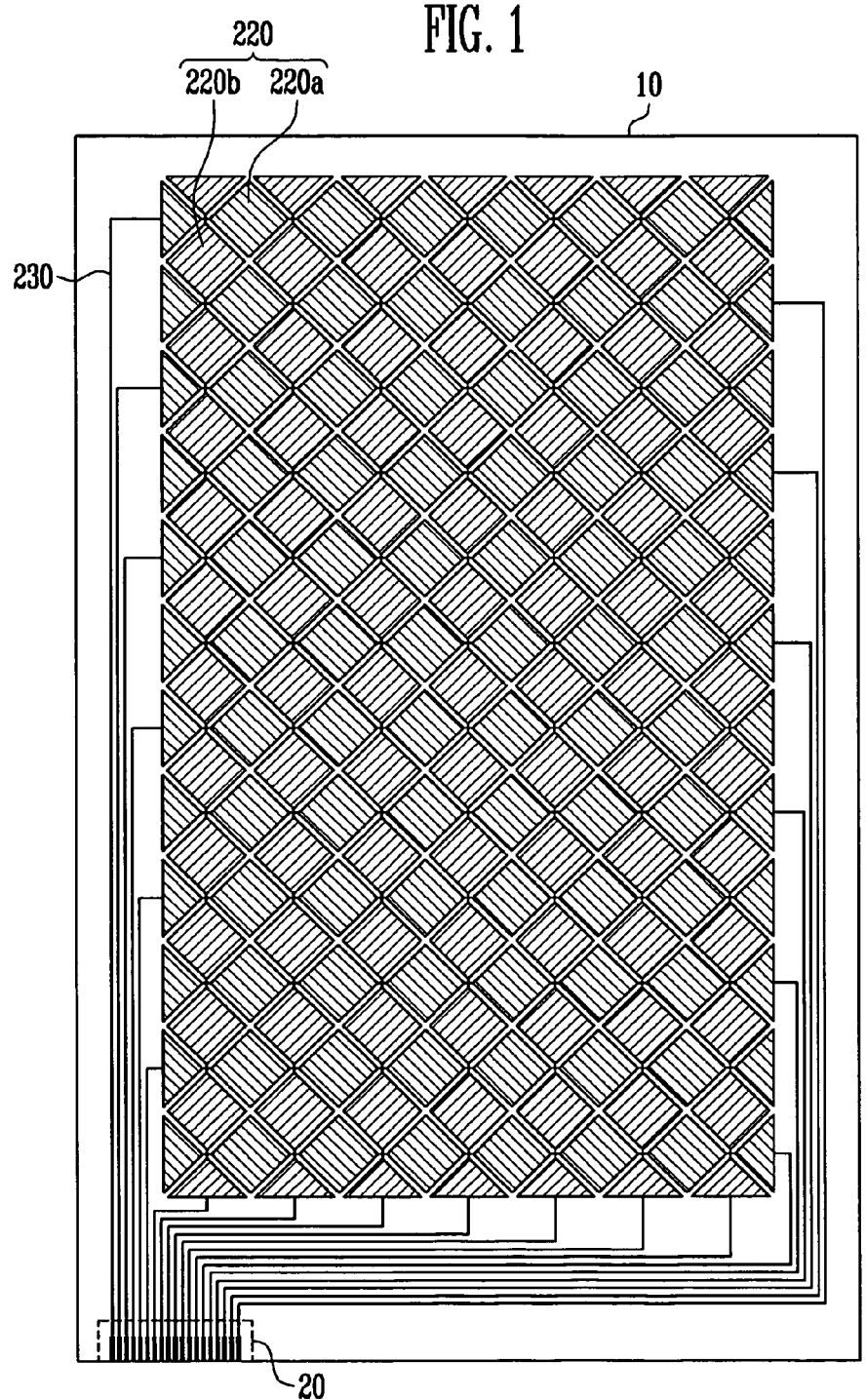
FIG. 1 illustrates a plan view of an exemplary touch panel.

Korean Patent Application No. 10-2010-0106739, filed on Oct. 29, 2010, in the Korean Intellectual Property Office, and entitled: "Flat Panel Display with Built-in Touch Panel" is incorporated by reference herein in its entirety.

In the following detailed description, exemplary embodiments have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In the figures, the dimensions of layers and regions may be exaggerated for clarity of illustration. In addition, when an element is referred to as being "on" another element, it can be directly on the other element or be indirectly on the other element with one or more intervening elements interposed therebetween. Also, when an element is referred to as being "connected to" another element, it can be directly connected to the other element or be indirectly connected to the other element with one or more intervening elements interposed therebetween. Hereinafter, like reference numerals refer to like elements.

Hereinafter exemplary embodiments will be described in detail with reference to the accompanying drawings.

Figure 2:
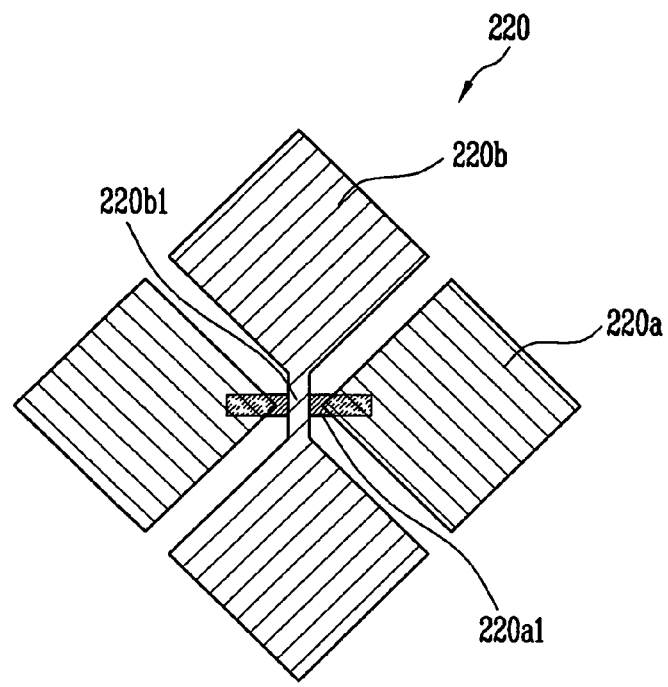
FIG. 2 illustrates an enlarged view of exemplary sensing cells of the touch panel illustrated in FIG. 1.

FIG. 1 illustrates a plan view of an exemplary touch panel. FIG. 2 illustrates a main part enlarged view showing an example of sensing cells of the touch panel shown in FIG. 1. For convenience of illustration, some of the sensing cells are shown in FIG. 2. However, the touch panel has a structure in which the sensing cells shown in FIG. 2 may be repeatedly arranged.

Referring to FIGS. 1 and 2, the touch panel may include a transparent substrate 10. The touch panel may include touch sensing patterns including, e.g., sensing cells 220 and outer lines 230, formed on one surface of the transparent substrate 10.

The sensing cells 220 may include a plurality of first sensing cells 220a formed to be connected for each row line along a first direction, e.g., a column direction. The sensing cells 220 may include a plurality of second sensing cells 220b alternately arranged not to be overlapped with the first sensing cells 220a and formed to be connected for each column line along a second direction, e.g., a column direction. The first direction may intersect, e.g., be perpendicular to, the second direction.

The sensing cells 220 may be formed of a transparent electrode material, e.g., indium tin oxide (ITO), so that light from a display panel (not shown) disposed below the touch panel may be transmitted to the sensing cells 220.

As shown in FIG. 2, the first sensing cells 220a may be connected to each other, e.g., along each line, in the first direction by a first connection pattern 220a1. The second sensing cells 220b may be connected to each other, e.g., along each line, in the second direction by a second connection pattern 220b1.

The first connection pattern 220a1 and/or the second connection pattern 220b1 may be patterned to have independent patterns. For example, the first and/or second connection pattern 220a1 and 220b1 may be patterned to be directly/indirectly connected to the corresponding first or second sensing cells 220a or 220b, or may be integrally connected to the corresponding first or second sensing cells 220a or 220b from a process of patterning the first and second sensing cells 220a and 220b.

According to exemplary embodiments, the first connection patterns 220a1 may be patterned to have independent patterns in one of an upper layer and a lower layer of the first sensing cells. The first connection patterns 220a1 may connect the first sensing cells 220a to one another for each line along the first direction while being electrically connected to the first sensing cells 220a at one of an upper portion or a lower portion of the first sensing cells 220a.

The first connection patterns 220a1 may be formed of a transparent electrode material, e.g., ITO like the sensing cells 220, or may be formed of a low-resistance opaque metallic material, e.g., like the sensing lines 230. The width of the first connection patterns 220a1 may be adjusted to minimize and/or prevent them from being visualized from an environment outside the touch panel.

The second connection patterns 220b1 may be integrally patterned with the second sensing cells 220b in a same patterning process so as to connect the second sensing cells 220b to one another for each line along the second direction. The second connection patterns 220b1 may be integrally formed with the second sensing cells 220b in a process of patterning the sensing cells 220.

An insulating layer (not shown), e.g., for enhancing and/or ensuring stability, may be interposed between the first connection patterns 220a1 and the second connection patterns 220b1.

The outer lines 230 may be used to connect the sensing cells 220 to a driving circuit for each line along the first and/or second direction. The outer lines 230 may be arranged in a non-touch active region formed at the outside of a touch active region. For example, outer lines 230 may be on the bottom surface of the upper substrate to connect lines of sensing cells along at least one of a first direction or a second direction to a driving circuit.

For example, the outer lines 230 may be electrically connected to row lines of the first sensing cells 220a and column lines of the second sensing cells 220b, so as to connect them to an external driving circuit (not shown) such as a position detecting circuit. The outer lines 230 may be connected to the external driving circuit through a pad portion 20, as shown in FIG. 1.

An edge pattern (not shown), e.g., a black matrix of a window (not shown), may be positioned on the outer lines 230. Thus, it may be possible to minimize and/or prevent the outer lines 230 from being visualized from an environment outside the touch panel, so that the material of the outer lines 230 may be selected in a wide range. For example, the outer lines 230 may be formed of a transparent electrode material used to form the sensing cells 220 and/or a low-resistance metallic material such as molybdenum (Mo), silver (Ag), titanium (Ti), copper (Cu), aluminum (Al), and/or Mo/Al/Mo.

The touch panel configured as described above is applicable to a capacitive touch panel. For example, if a contact object such as a user's finger or stylus pen comes in contact with the touch screen panel, a change in capacitance caused by a contact position may be transferred from the sensing cells 220 to the driving circuit (not shown) via the outer lines 230 and the pad portion 20. The change in capacitance may be converted into an electrical signal by X and Y input processing circuits (not shown), thereby detecting the contact position. However, embodiments are not limited therefore.

A touch panel may be formed on an independent substrate and may be attached to the top surface of a display panel. However, the entire thickness of a flat panel display may be increased, and the visibility of an image may be deteriorated due to the gap between the touch panel and the display panel.

According to an exemplary embodiment, an upper substrate of the display panel may be used as a substrate of the touch panel. For example, the touch sensing patterns may be formed in the interior of the display panel, i.e., on the bottom surface of the upper substrate, so that it may be possible to, e.g., decrease the thickness of the flat panel display and enhance the visibility of an image.

The outer lines 230 may be formed on the bottom surface of the upper substrate of the display panel and may be connected, e.g., directly connected, to a lower substrate by using connection lines formed on a top surface of the lower substrate. For example, the pad portions 20 of the touch panel may be formed together with the pad portion of the display panel on the lower substrate. Thus, the touch panel and the display panel may share one flexible printed circuit board (FPCB). Accordingly, a flat panel display with a built-in touch panel may be capable of simplifying manufacturing processes and decreasing product cost.

Exemplary embodiments include a structure for easily connecting the outer lines 230 formed on the upper substrate to the lower substrate. This will be described in detail later.

FIGS. 1 and 2 illustrate an exemplary touch panel, but embodiments are not limited thereto. For example, although the capacitive touch panel in FIGS. 1 and 2 includes diamond-shaped sensing cells 220 alternately distributed and arranged in the touch active region, embodiments may be applied to a capacitive touch panel provided with different touch panel structures, e.g., structures in which a pair of triangular-bar-shaped sensing electrodes are repeatedly arranged in row and/or column directions. Embodiments also may be applied to other types of touch panels, e.g., a resistive overlay touch panel.

Figure 3:
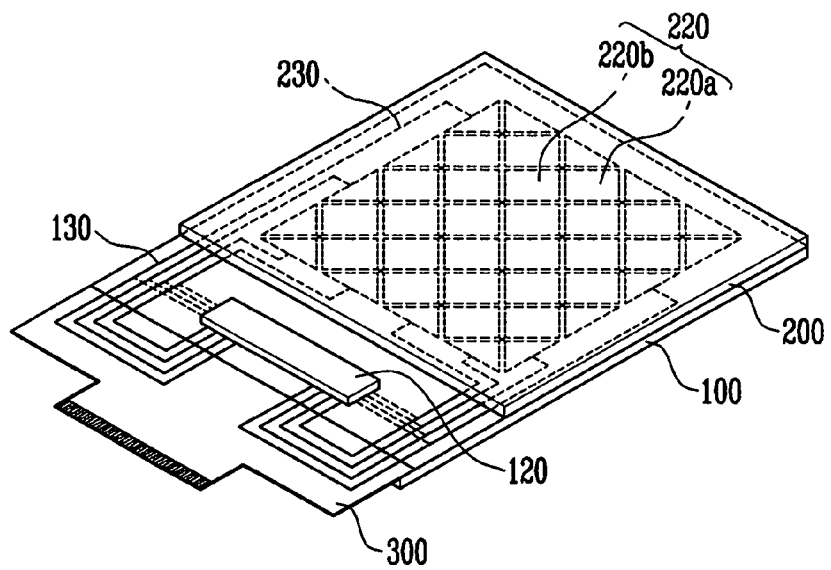
FIG. 3 illustrates a perspective view of a flat panel display with a built-in touch panel according to an exemplary embodiment.
Figure 4:
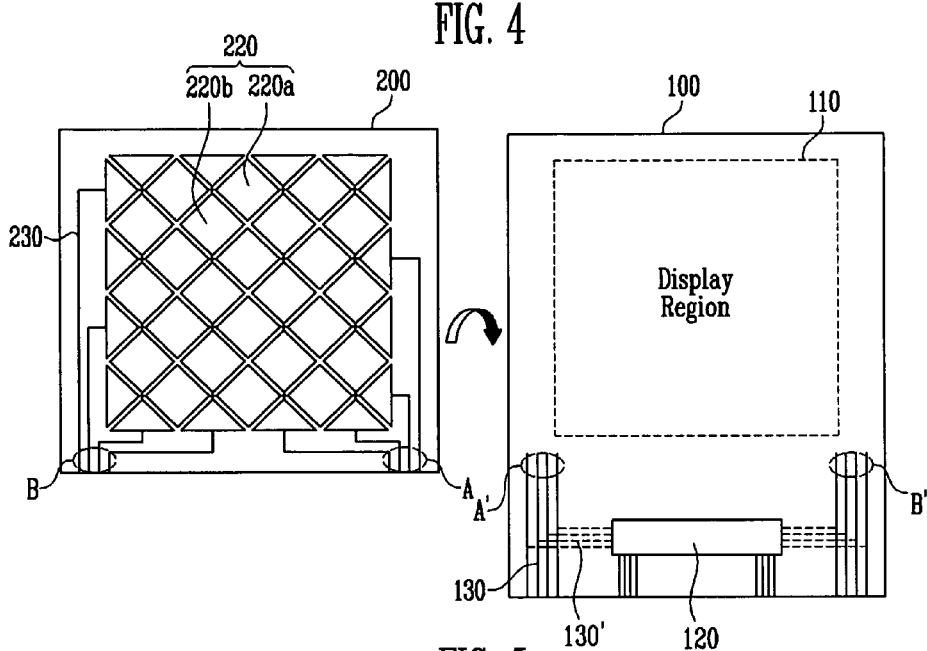
FIG. 4 illustrates a plan view schematically showing upper and lower substrates of the flat panel display illustrated in FIG. 3.
Figure 5:
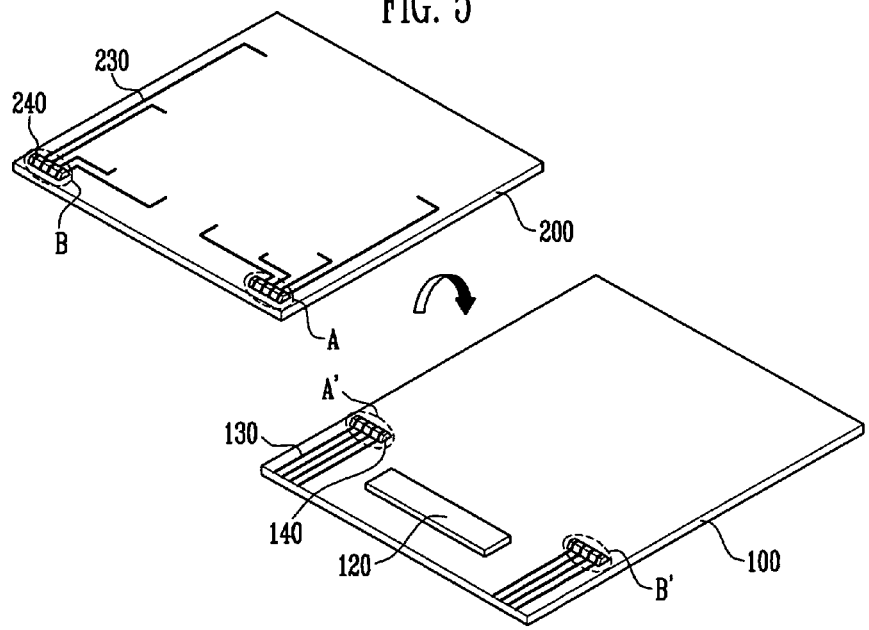
FIG. 5 illustrates a perspective view schematically showing an example of outer lines and connection lines, respectively formed in the upper and lower substrates illustrated in FIGS. 3 and 4, and step forming patterns formed at lower portions of the outer lines and the connection lines.

FIG. 3 illustrates a perspective view showing a flat panel display with a built-in touch panel according to an exemplary embodiment. FIG. 4 illustrates a plan view schematically showing upper and lower substrates illustrated in FIG. 3. FIG. 5 illustrates a main part perspective view schematically showing examples of outer lines and connection lines, respectively formed in the upper and lower substrates shown in FIGS. 3 and 4, and step forming patterns formed at lower portions of the outer lines and the connection lines.

In FIG. 4 are shown an exemplary bottom surface of the upper substrate and an exemplary top surface of the lower substrate of a flat panel display, according to an exemplary embodiment. Touch sensing patterns may be formed on the bottom surface of the upper substrate. Pixels and connection lines that constitute a display region may be formed on the top surface of the lower substrate. A driving IC and the like may be mounted on the top surface of the lower substrate. For convenience of illustration, detailed descriptions of components of a display panel for displaying an image will be omitted in FIGS. 3 to 5.

Referring to FIGS. 3 and 4, the flat panel display with the built-in touch panel may be implemented by integrating the display panel and the touch panel with each other. Particularly, touch sensing patterns may be positioned in the interior of the display panel. For example, the touch sensing patterns including sensing cells 220 and outer lines 230 may be formed on a bottom surface of an upper substrate 200 that constitutes the display panel.

According to an exemplary embodiment, the flat panel display with the built-in touch panel may include a display panel including upper and lower substrates 100 and 200 opposite to each other, and touch sensing patterns, e.g., including sensing cells 220 and outer lines 230, may be formed on the bottom surface of the upper substrate 200, which faces the lower substrate 200.

The outer lines 230, e.g., for driving the touch panel, formed on the bottom surface of the upper substrate 200 may be connected to an FPCB 300 via the lower substrate 100, e.g., as shown in FIG. 3, while being electrically connected to connection lines 130 formed on the lower substrate 100.

The outer lines 230, e.g., for driving the touch panel, may be connected to a driving IC 120 via the connection lines 130 and the FPCB 300. The driving IC 120 may include a control circuit for driving the display panel, a control circuit for driving the touch panel, a position detecting circuit, and/or the like.

The outer lines 230 formed on the bottom surface of the upper substrate 200 may be connected to the lower substrate 100 by the connection lines 130 formed on the top surface of the lower substrate 100. Accordingly, the touch panel and the display panel may share the one FPCB 300 between each other.

The FPCB 300 may be connected at one end, e.g., one end at which a pad portion (not shown) is formed, of the lower substrate 100 so as to be electrically connected to driving lines (not shown) of the display panel, thereby supplying a control signal for controlling the display panel. Furthermore, the FPCB 300 may be connected to the outer lines 230 for driving the touch panel via the connection lines 130, thereby supplying a control signal for controlling the touch panel. In this case, the FPCB 300 may be implemented in the form that an FPCB for driving the display panel and an FPCB for driving the touch panel are integrated with each other.

Thus, the bonding and testing processes of the FPCB 300 may be simpler than those in a case where the FPCBs for respectively driving the touch panel and the display panel are separately provided. Accordingly, it may be possible to simplify manufacturing processes and to reduce product cost.

In a case where the FPCBs for respectively driving the touch panel and the display panel are separately provided, the outer lines 230 for driving the touch panel may be formed only at one side of the upper substrate 200, e.g., the center at one end or one side portion of the upper substrate 200. However, in a case where the outer lines 230 for driving the touch panel are connected to the connection lines 130 on the lower substrate 100 as described in an exemplary embodiment, the outer lines 230 may be routed into at least both sides of the upper substrate 200, so that the lining process can be easily performed. For example, as illustrated in FIG. 4, the outer lines 230 may be formed on two opposing sides of the upper substrate 200, and may be formed on one side between the two opposing sides of the upper substrate 200.

A display region 110 may be formed on the lower substrate 100 of the display panel. Pixel electrodes of a liquid crystal display or organic light emitting diodes of an organic light emitting display and a plurality of pixels, which may include thin film transistors for driving them, may be formed in the display region 110. In some case, the driving IC 120, e.g., for controlling an image displayed in the display region 110, may be mounted at one side of the lower substrate 100.

In the flat panel display with the built-in touch panel according to an exemplary embodiment, control circuits for driving the touch panel, a position detecting circuit, and/or the like may be mounted together with the driving IC 120. It may be designed that connection lines 130', which may be connected to the outer lines 230 for driving the touch panel, do not pass through the FPCB 300, but are connected, e.g., directly connected, to the driving IC 120, e.g., as shown by dotted line in FIGS. 3 and 4.

The outer lines 230 for driving the touch panel may be directly connected to the driving IC 120 on the lower substrate 100 from the upper substrate 200. In this case, it may be possible to provide an effect that decreases resistance.

Meanwhile, in this embodiment, the connection lines 130 and the outer lines 230 may come in contact, e.g., direct contact, with each other in contact regions A and A', and B and B'. For example, one set of connection lines 130 may come into direct contact with opposing outer lines 230 in contact regions A and A'. Another set of connection lines 130 may come into direct contact with opposing outer lines 230 in contact regions B and B'. Accordingly, it may be possible to have a relatively simple structure and to easily perform their connection.

Referring to FIG. 5, at least one of island-shaped step forming patterns 140 and 240 may be formed at lower portions of the connection lines 130 and the outer lines 230, respectively. The island-shaped step forming patterns 140 and 240 may allow the lower portions of the connection lines 130 and outer lines 230, respectively, to be protruded to the opposite sides so that the connection lines 130 and the outer lines 230 come in contact with each other. For example, the island-shaped step forming patterns 140 and 240 may allow specific portions of the respective connection lines 130 and the outer lines 230 to be raised. As such, the raised portions of the connection lines 130 and the outer lines 230 may contact, e.g., be directed connected with, each other.

For examples, the flat panel display with the built-in touch panel, according to an exemplary embodiment, may include step forming patterns 140 and 240 that are disposed on one or more portions between the outer lines 230 and the upper substrate 200 and between the connection lines 130 and the lower substrate 100, respectively. The step forming patterns 140 or 240 may be formed in contact regions A, A', B, and B'. Accordingly, the outer lines 230 and connection lines 130 formed on the upper and lower substrates 200 and 100, respectively, may be connected to each other so as to allow the outer lines 230 or connection lines 130 to be protruded, thereby easily connecting the outer lines 230 and the connection lines 130 to each other. Accordingly, the outer lines 230 and the connection lines 130 may be electrically connected while coming in direct contact with each other.

For example, an upper step forming pattern, e.g., including step forming patterns 240, may be formed between the outer lines 230 and the upper substrate 200. A lower step forming pattern, e.g., including step forming patterns 140, may be formed between the connection lines 130 and the lower substrate 100. The lower step forming patterns may correspond to the upper step forming patterns. The upper and lower step forming patterns may be provided in the contact regions, e.g., regions A and A', and B and B'. The outer lines 230 and the connection lines 130 may be connected to each other in the contact regions. Accordingly, the outer lines 230 and the connection lines 130 may easily come in contact with each other.

The step forming patterns 140 and 240 may include an elastic organic insulating layer composed of one or more layers. Particularly, the uppermost portions of the step forming patterns 140 and 240 may be formed of an organic insulating layer. The step forming patterns 120 and 240 may be configured so that the outer lines 230 and the connection lines 130 can maintain a stable contact state.

In the process of forming the step forming patterns 140 and 240, the step forming patterns 140 and 240 may be formed higher, e.g., by a predetermined height, than a thickness to be maintained after the lower and upper substrates 100 and 200 when joined together using an elastic organic insulating material. The upper and lower substrates 100 and 200 may be joined together by applying a predetermined external pressure thereto. Then, the outer lines 230 and the connection lines 130 can maintain a stable contact state.

The step forming patterns 140 and 240 may be formed at lower portions of one of the plurality of outer lines 230 and the plurality of connection lines 130. The plurality of outer lines 230 or the plurality of connection lines 130 may share one step forming pattern with each other.

For example, when the outer lines 230 are arranged to be routed into both sides of the upper substrate 200, the step forming patterns 240 formed between the outer lines 230 and the upper substrate 200, e.g., to allow the outer lines 230 to be protruded in the direction of the lower substrate 100, may be formed at both the sides of the upper substrate 200, respectively. The step forming patterns 140 formed between the connection lines 130 and the lower substrate 100 may be formed at both the sides of the lower substrate 100, respectively, to correspond to the step forming patterns 240.

A plurality of step forming patterns 140 and 240 may be provided on at least one side of each of the upper and lower substrates 200 and 100. In this case, one or more outer lines 230 or connection lines 130 may be disposed on each of the corresponding step forming patterns 140 and 240. This will be described in detail later with reference to FIGS. 6A and 6B.

Figure 6A:
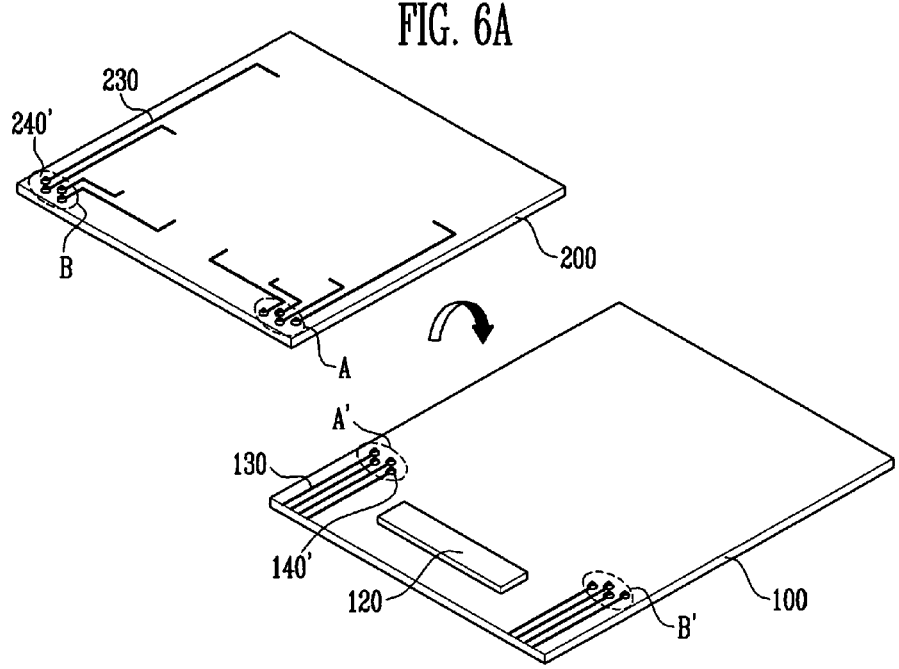
FIGS. 6A and 6B illustrate perspective views schematically showing examples of outer lines and connection lines, respectively formed in the upper and lower substrates illustrated in FIGS. 3 and 4, and step forming patterns formed at lower portions of the outer lines and the connection lines.
Figure 6B:
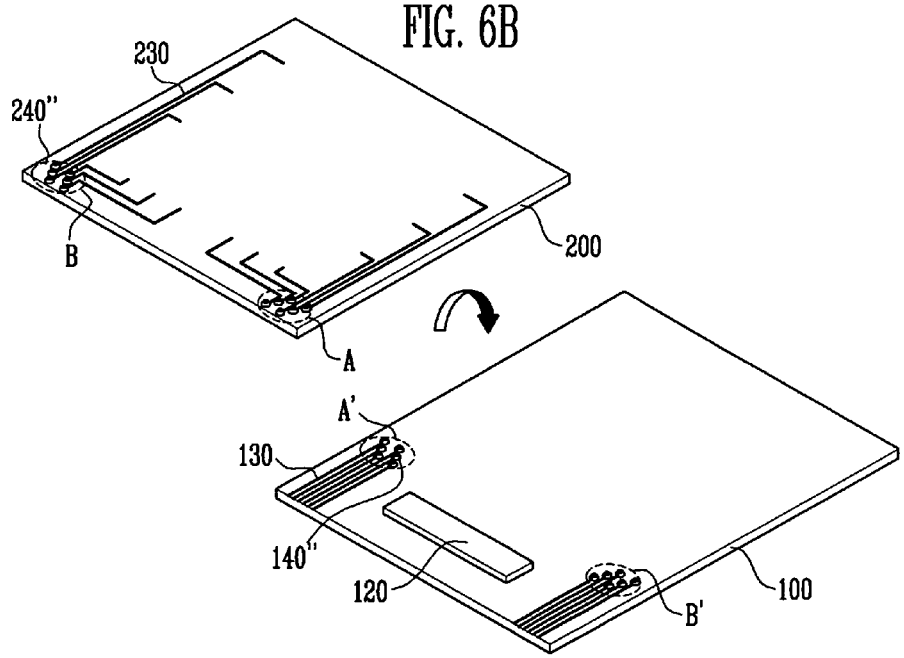

FIGS. 6A and 6B illustrate a perspective view schematically showing another example of outer lines and connection lines formed on the respective upper and lower substrates shown in FIGS. 3 and 4, and step forming patterns formed at respective lower portions of the outer lines and the connection lines. In FIG. 6, components identical or similar to those of FIG. 5 are designated by the same reference numerals, and their detailed descriptions will be omitted.

Referring to FIGS. 6A and 6B, a plurality of step forming patterns 140', 140'', 240' and 240'' may be formed on the corresponding portions of upper or lower substrates 200 and 100. For example, a plurality of step forming patterns 140' may be formed at one side of the lower substrate relative to the display area. A plurality of step forming patterns 140'', 240' and 240'' may be formed at only one side of the upper or lower substrates 200 and 100.

For example, as shown in FIG. 6A, neighboring step forming patterns 140' and 240' may be arranged to cross each other so as not to be positioned on the same horizontal or vertical line. That is, a plurality of step forming patterns 140 and 240 may be divided on a plurality of columns or rows to be arranged in a zigzag pattern or the like.

One or more lines, e.g., one outer line 230 or one connection line 130, may be positioned on each of the step forming patterns 140' and 240'. In this case, the outer line 230 or connection line 130 that passes through the top of the step forming patterns 140' and 240' positioned on a first horizontal line may be disposed between the neighboring step forming patterns 140' and 240', so that a short defect between the lines is reduced and/or prevented.

The outer lines 230 or connection lines 130 may be widely formed on the top of the step forming patterns 140' and 240', so that the contact area in the contact regions, e.g., contact regions A, A', B, and B' may be extended, thereby decreasing contact resistance therebetween.

If the number of the outer lines 230 or connection lines 130 disposed at one side is increased, the step forming patterns 140' and 240' are not divided on two horizontal lines as shown in FIG. 6A, but the step forming patterns 140'' and 240'' may be divided on three horizontal lines or more horizontal lines as shown in FIG. 6B.

Figure 7:
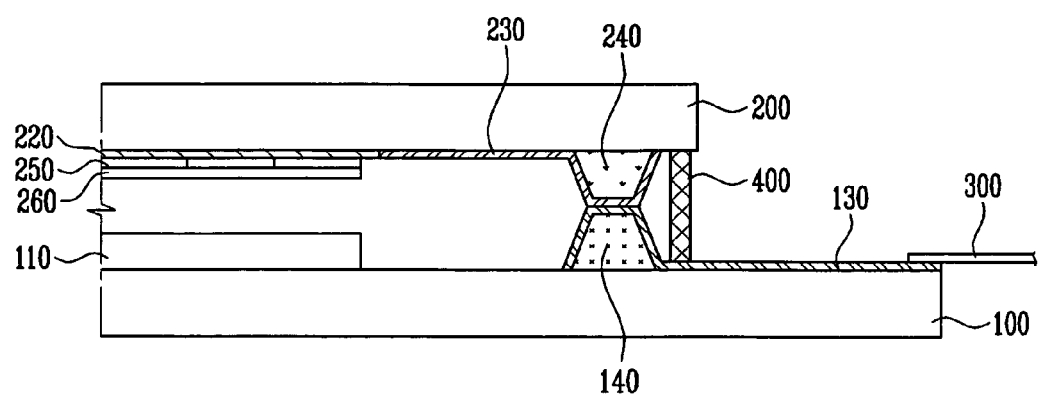
FIG. 7 illustrates a sectional view schematically showing a section of the flat panel display with the built-in touch panel according to an exemplary embodiment.

FIG. 7 illustrates a sectional view schematically showing a section of the flat panel display with the built-in touch panel according to an exemplary embodiment. For convenience of illustration, detailed descriptions of internal components of a display region in which pixels are formed will be omitted.

Referring to FIG. 7, a display region 110 may include having a plurality of pixels formed therein, connection lines 130 and the like formed on a lower substrate 100 (a driving IC is omitted), and an FPCB 300 connected at one side of the lower substrate 100.

According to an exemplary embodiment, when the flat display panel is an organic light emitting display panel, organic light emitting diodes and a plurality of pixels provided with thin film transistors and capacitors for driving the organic light emitting diodes may be formed in the display region 110. When the flat display panel is a liquid crystal display panel, pixel electrodes and a plurality of pixels provided with thin film transistors and capacitors for driving the pixel electrodes may be formed in the display region 110. The flat display panel is not limited to the organic light emitting display panel and the liquid crystal display panel, but may be set as another type of display panel.

Sensing cells 220 and outer lines 230 connected to the sensing cells 220 may be formed on the bottom surface of an upper substrate 200. When the display panel is a liquid crystal display panel or the like, a color filter 250, a common electrode 260 and the like may be further formed on the bottom surface of the upper substrate 200.

The lower and upper substrates 100 and 200 may be joined together by a sealing member 400.

One end of the outer lines 230, e.g., formed on the bottom surface of the upper substrate 200, may be directly connected to the connection lines 130, e.g., formed on the top surface of the lower substrate 100, so that the outer lines 230 and the connection lines 130 are electrically connected to each other. Step forming patterns 140 and 240 may be formed between the upper substrate 200 and the outer lines 230 and between the lower substrate 100 and the connection lines 130, respectively, in contact regions of the outer lines 230 and the connection lines 130.

The step forming patterns 140 and 240 may be simultaneously formed using the same material as a component selected in the process of forming other components for implementing the display panel or the touch panel. Thus, the step forming patterns 140 and 240 may be easily formed without adding a separate process and material.

For example, the step forming pattern 240, e.g., formed on the bottom surface of the upper substrate 200 may be formed of the same material in the same process as one or more of the color filter 250, a black matrix (not shown), and a column spacer (not shown). The step forming pattern 140 be formed of the same material in the same process as one or more of a passivation layer (not shown), a column spacer (not shown), and the like.

While in FIG. 7 the sensing cells 220 and the outer lines 230 come in contact with each other through their sides in a region in which they are connected to each other, they may be at least partially overlapped with each other at a connection portion. For example, the outer lines 230 may be disposed to be overlapped with upper or lower portions of the sensing cells 220 at one side adjacent to the sensing cells 220.

For example, the outer lines 230 may be connected to the sensing cells 220 at the lower or upper portions of the sensing cells 220 according to the design structure. Since the step forming pattern 240 may be formed before the outer lines 230 are formed, the step forming pattern 240 may be formed of the same material as one or more selected from the color filter 260, the black matrix and/or the column spacer according to the design structure.

The step forming pattern 140, e.g., formed on the top surface of the lower substrate 100, may be formed of the same material in the same layer as a passivation layer (not shown), a column spacer (not shown), and the like. For example, the step forming pattern 140 may be formed of a same material in the same layer as an element formed in the display region of the lower substrate 100.

As described above, the touch sensing patterns may be formed on the bottom surface of the upper substrate 200 by using the upper substrate 200 of the display panel as a substrate of the touch panel, so that it is possible to decrease the thickness of the flat panel display and to enhance the visibility of the flat panel display.

Particularly, the touch panel implemented on the upper substrate 200 may be easily connected to the lower substrate 100 by forming the connection lines 130 on the top surface of the display panel, and connecting the connection lines 130 to the outer lines 230 for driving the touch panel, formed on the bottom surface of the upper substrate 200. Accordingly, the touch panel and the display panel may share one FPCB 300 with each other, so that it is possible to simplify manufacturing processes and to reduce product cost. Therefore, a flat panel display with a built-in touch panel may enable a touch panel and a display panel to be connected to one flexible printed circuit board.

By way of summation and review, if a touch panel is separately fabricated and then attached to a front face of a display panel in an image display such as a liquid crystal display or organic light emitting display, the entire thickness of the image display is increased, and the visibility of an image may be degraded due to the gap between the touch panel and the display panel.

Embodiments include touch sensing patterns formed on the bottom surface of an upper substrate by using the upper substrate of a display play panel as a substrate of a touch panel, so that it is possible to decrease its thickness and enhance the visibility of an image. Accordingly, a flat panel display with a built-in touch panel may decrease its thickness and enhance the visibility of an image by using an upper substrate of a display panel as a substrate of the touch panel.

Embodiments may include a flat panel display with a built-in touch panel which may enable a touch panel and a display panel to be connected to one flexible printed circuit board. The touch panel and the display panel may share one FPCB with each other by forming connection lines on the top surface of a lower substrate of the display panel and connecting the connection lines to outer lines for driving the touch panel, formed on the bottom surface of the upper substrate. Accordingly, it is possible to simplify manufacturing processes and to reduce product cost, e.g., by connecting the touch panel and display panel to one flexible printed circuit board.

While in present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A flat panel display with a built-in touch panel, the flat panel display comprising:
   a display panel including a lower substrate, an upper substrate, and a plurality of touch sensing patterns on the upper substrate, the lower substrate including a display region and a non-display region, the non-display region defining a periphery of the lower substrate and enclosing the display region;
   the plurality of touch sensing patterns including a plurality of sensing cells on a bottom surface of the upper substrate that faces the lower substrate, the plurality of touch sensing patterns overlapping the display region on the lower substrate;
   a plurality of outer lines on the bottom surface of the upper substrate that connect lines of sensing cells of the plurality of sensing cells along at least one of a first direction or a second direction to a driving circuit, the outer lines including first raised portions that face the lower substrate; and a plurality of connection lines that correspond to respective outer lines on the lower substrate, the connection lines including second raised portions that face the upper substrate, wherein:

the plurality of outer lines are connected to the driving circuit via the plurality of connection lines on the lower substrate the first raised portions of the plurality of outer lines are electrically connected to the second raised portions of corresponding connection lines, the first raised portions of the outer lines and the second raised portions of the connection lines being only in the non-display region, and the first raised portions of the outer lines being in constant and direct contact with the second raised portions of the connection lines, and step forming patterns between the first raised portions of the outer lines and the upper substrate and between the second raised portions of the connection lines and the lower substrate, heights of the respective step forming patterns being set such that first raised portions and second raised portions are in constant contact with each other.

2. The flat panel display according to claim 1, wherein the step forming pattern includes an organic insulating layer having of one or more layers.

3. The flat panel display according to claim 1, wherein the plurality of outer lines or the plurality of connection lines share one step forming pattern with one another.

4. The flat panel display according to claim 1, wherein the step forming pattern includes a plurality of step forming patterns, and one or more outer lines of the plurality of outer lines and one or more connection lines of the plurality of connection lines are on each of the step forming patterns.

5. The flat panel display according to claim 4, wherein neighboring step forming patterns of the plurality of step forming patterns are arranged to cross each other so to be positioned on different horizontal lines and vertical lines.

6. The flat panel display according to claim 4, wherein the plurality of step forming patterns are disposed in a zigzag pattern.

7. The flat panel display according to claim 1, wherein at least a portion of the step forming pattern is on the bottom surface of the upper substrate and includes the same material as a color filter on the upper substrate, a black matrix on the upper substrate, or a column spacer on the upper substrate.

8. The flat panel display according to claim 1, wherein at least a portion of the step forming pattern is on the top surface of the lower substrate and includes the same material as a passivation layer on the lower substrate or a column spacer on the lower substrate.

9. The flat panel display according to claim 1, wherein outer lines of the plurality of outer lines are routed on opposing sides of the upper substrate, and one or more step forming patterns are arranged between the outer lines and the upper substrate, such that the outer lines are protruded in a direction toward the lower substrate at ends of the opposing sides of the upper substrate.

10. The flat panel display according to claim 1, wherein the outer lines and the connection lines are electrically connected and in direct contact with each other.

11. The flat panel display according to claim 10, wherein the step forming pattern includes:

an upper step forming pattern between outer lines of the plurality of outer lines and the upper substrate; and a lower step forming pattern between connection lines of the plurality of connection lines and the lower substrate, the lower step forming pattern corresponding to the upper step forming pattern and being in a contact region in which the outer lines of the plurality of outer lines are in contact with the corresponding connection lines of the plurality of connection lines.

12. The flat panel display according to claim 1, further comprising a flexible printed circuit board (FPCB) connected to one end of the lower substrate and electrically connected to driving lines of the display panel, the FPCB being connected to the plurality of outer lines via the corresponding connection lines of the plurality of connection lines.

13. The flat panel display according to claim 1, further comprising a driving IC mounted at one side of the lower substrate, the driving IC being connected to the plurality of outer lines via the corresponding connection lines of the plurality of connection lines.

14. The flat panel display according to claim 1, wherein:

the first raised portions of the outer lines extend from the bottom surface of the upper substrate toward the lower substrate so as to be closer to the lower substrate than other portions of the outer lines, and the second raised portions of the connection lines extend from the lower substrate toward the bottom surface of the upper substrate so as to be closer to the upper substrate than other portions of the connection lines.

15. The flat panel display according to claim 1, wherein the first raised portions of the outer lines are directly coupled to the second raised portions of the connection lines.

16. The flat panel display according to claim 1, wherein the first raised portions of the outer lines directly contact corresponding second raised portions of the connection lines only in the non-display region of the lower substrate.

17. The flat panel display according to claim 1, wherein the outer lines are only on a region of the upper substrate that overlaps the non-display region of the lower substrate.

18. The flat panel display according to claim 1, wherein the outer lines and the touch sensing patterns are directly on the bottom surface of the upper substrate, the outer lines being in a peripheral region with respect to a region including all of the touch sensing patterns.

* * * * *